United States Patent

Kim et al.

Patent Number: 5,982,923
Date of Patent: Nov. 9, 1999

[54] METHOD OF EXTRACTING FEATURES FROM THREE-DIMENSIONAL GEOMETRIC DATA

[75] Inventors: Hyun Kim; Hwa Gyoo Park; Chi Jae Oh, all of Daejeon, Rep. of Korea

[73] Assignee: Electronics and Telecommunications Research Institute, Daejeon, Rep. of Korea

[21] Appl. No.: 09/007,816

[22] Filed: Jan. 15, 1998

[30] Foreign Application Priority Data

Dec. 26, 1997 [KR] Rep. of Korea ................. 97-74668

[51] Int. Cl.$^6$ ................................................. G06K 9/00
[52] U.S. Cl. ...................................... 382/154; 345/419
[58] Field of Search ............................. 382/154, 190, 382/193, 204; 345/419, 420, 421, 423, 429

[56] References Cited

U.S. PATENT DOCUMENTS

| | | | |
|---|---|---|---|
| 5,265,197 | 11/1993 | Kondo | 395/120 |
| 5,561,747 | 10/1996 | Crocker et al. | 395/119 |
| 5,768,156 | 6/1998 | Tautges et al. | 364/578 |
| 5,844,563 | 12/1998 | Harada et al. | 345/420 |

*Primary Examiner*—Christopher S. Kelley
*Attorney, Agent, or Firm*—Antonelli, Terry, Stout & Kraus, LLP

[57] ABSTRACT

The present invention relates to a method of extracting features from three-dimensional geometric data.

Heretofore, an expert has contrived a process planing by extracting a distinctive point from three-dimensional geometric data and inputting it as processing information.

Taking such contrivance into consideration, the present invention provides a method of obtaining a face-edge connection relation graph from three-dimensional geometric data taken from a CAD system, building it in the form of a face-edge adjacency relation matrix, searching for a cut node which severs the remaining faces by eliminating an optional face therefrom, and extracting the two severed subgraphs as features and a method of extracting features using a multi-cut node which selects an optional face first, eliminates another optional face together with the selected face, searches the connection of the remaining faces and finds for the two subgraphs disconnected by eliminating those two faces in order to overcome the limitations of single cut node.

Therefore, the present invention, when used, makes it easy to obtain data necessary for a process planing by automatically extracting features for processing of machines and so forth from three-dimensional geometric data by means of a computer.

3 Claims, 3 Drawing Sheets

FIG.3
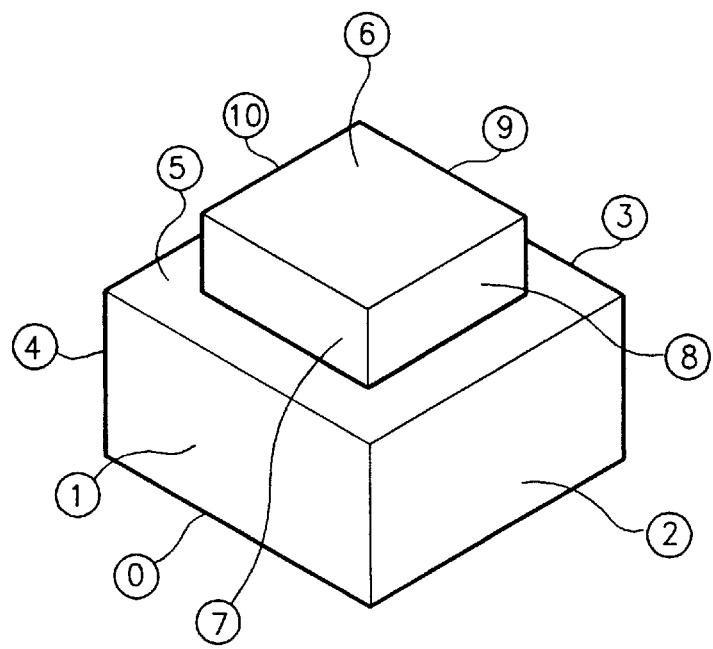
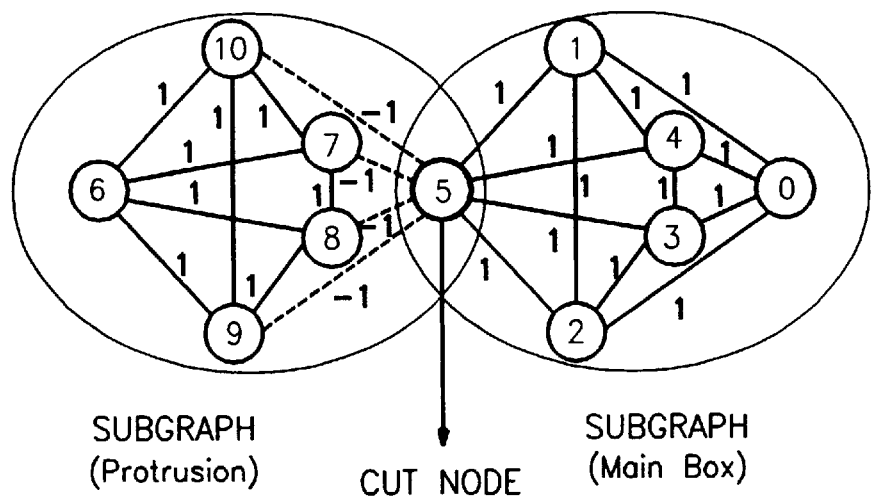
SUBGRAPH
(Protrusion)   CUT NODE   SUBGRAPH
(Main Box)

METHOD OF EXTRACTING FEATURES FROM THREE-DIMENSIONAL GEOMETRIC DATA

BACKGROUND OF THE INVENTION

1. Field of the Invention

The present invention relates to a method of automatically extracting a feature necessary for a process planing by means of a computer from three-dimensional geometric data taken from a CAD system.

2. Description of the Prior Art

From a process planning viewpoint, the geometric data itself obtained from the CAD system is not provided with information required for a process plan. Up to the present, therefore, an expert has manually designated features related to processing with a look to a geometric model or a drawing when a shape is fixed by the CAD system and he intends to carry out his process planing to manufacture it.

SUMMARY OF THE INVENTION

Since an expert works out a process planing by manually designating features related to process planning with a look to a geometric model or a drawing, it takes much time and the process planing cannot be worked out unless by the expert.

Moreover, in order to carry out the process planing by means of a computer, it is positively necessary to develop a method of automatically obtaining information required for process planning from three-dimensional geometric data by means of a computer.

The present invention suggests a method of automatically extracting features required for a process planing by means of a computer from geometric model made by the CAD system.

The present invention is a branch of computer aided design and process planning technology. The basic method of automatically extracting the feature from the geometric model made by the CAD system is a method of using a face-edge graph. In other words, a boundary representation data file for a three-dimensional geometric model is read, from which the relation of the faces of an object is obtained, and it is formed into a face-edge based adjacency graph and then subgraphs separated by an optional cut node are searched and extracted as features.

BRIEF DESCRIPTION OF THE DRAWINGS

FIG. 3 is an illustration for describing the conception of a face-edge adjacency graph and a cut node under the present invention.

DETAILED DESCRIPTION OF THE PREDERRED EMBODIMENT

Figure 1:
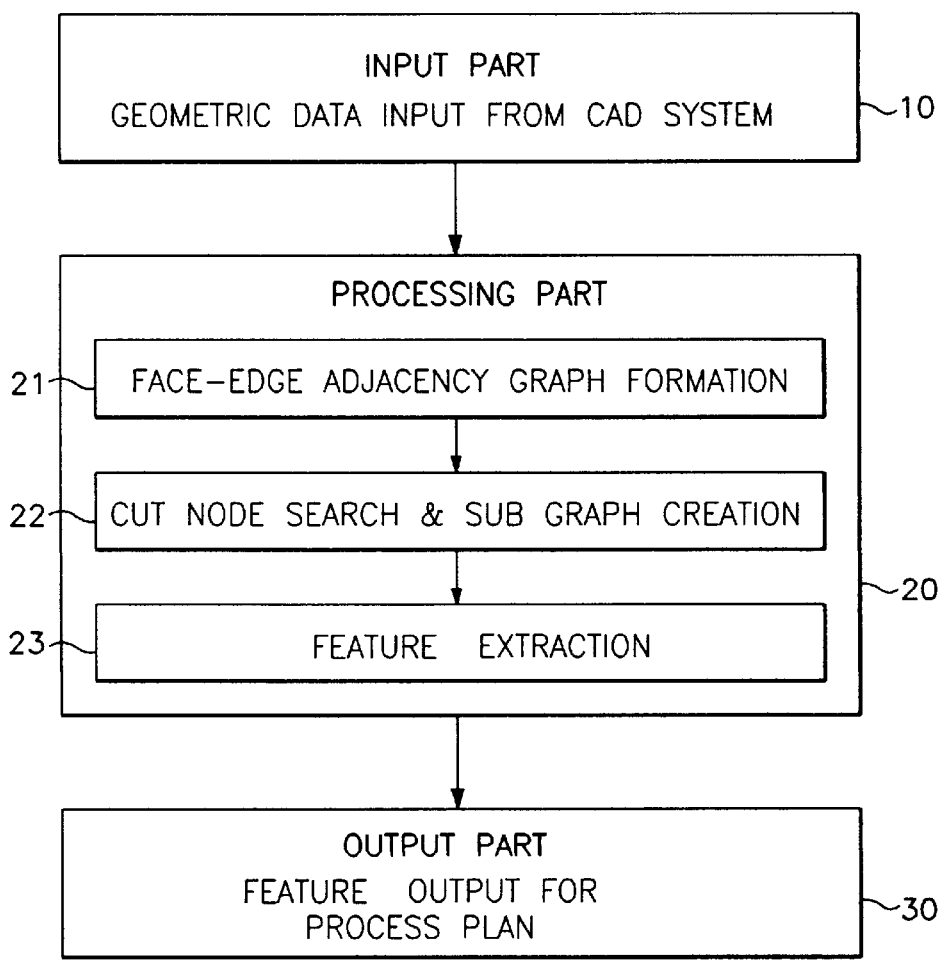
FIG. 1 is a block diagram for extracting features from three-dimensional geometric data under the present invention.

An embodiment of the method for extracting features required for a process planing by the use of computer algorithm will now be described in detail by referring to the drawings attach hereto.

FIG. 1 is a block diagram for extracting features from three-dimensional geometric data under the present invention.

As illustrated, it comprises:

as input part(10) which receives input of geometric data from a CAD system, a processing part(20) which forms a adjacency graph by extracting a face and an edge from the geometric data inputted through the input part(10) and extracts features by searching for a cut node and creating subgraphs, and an output part(30) which outputs the feature required for a process planing extracted from the processing part (20).

The processing part(20) comprises a adjacency graph forming part(21) which forms a adjacency graph for the face and edge, subgraph creating part(22) which searches for the cut node and creates the subgraphs by using the face-edge adjacency graph and features extracting part(23) which extracts the feature by the face-edge connection graph, the cut node and the subgraphs.

It is to perform a step of forming a matrix for the face-edge adjacency relation in the three-dimensional geometric data inputted from the CAD system, a step of forming the adjacency relation matrix again by eliminating an optional face on the graph created by the formation of the matrix and searching for the cut node, a step of forming a result matrix with the subgraphs divided by the cut node if the graph is divided into the two graphs as a result of searching for the cut node, a step of repeating in turn the above steps of searching for the cut node and forming the result matrix by restoring the eliminated face and eliminating again the other optional face for all faces, and storing each basic shape obtained as a result of the repetition and a step of extracting the feature from the result matrix and recognizing it after performing the above steps for all shapes divided into the subgraphs.

Figure 2:
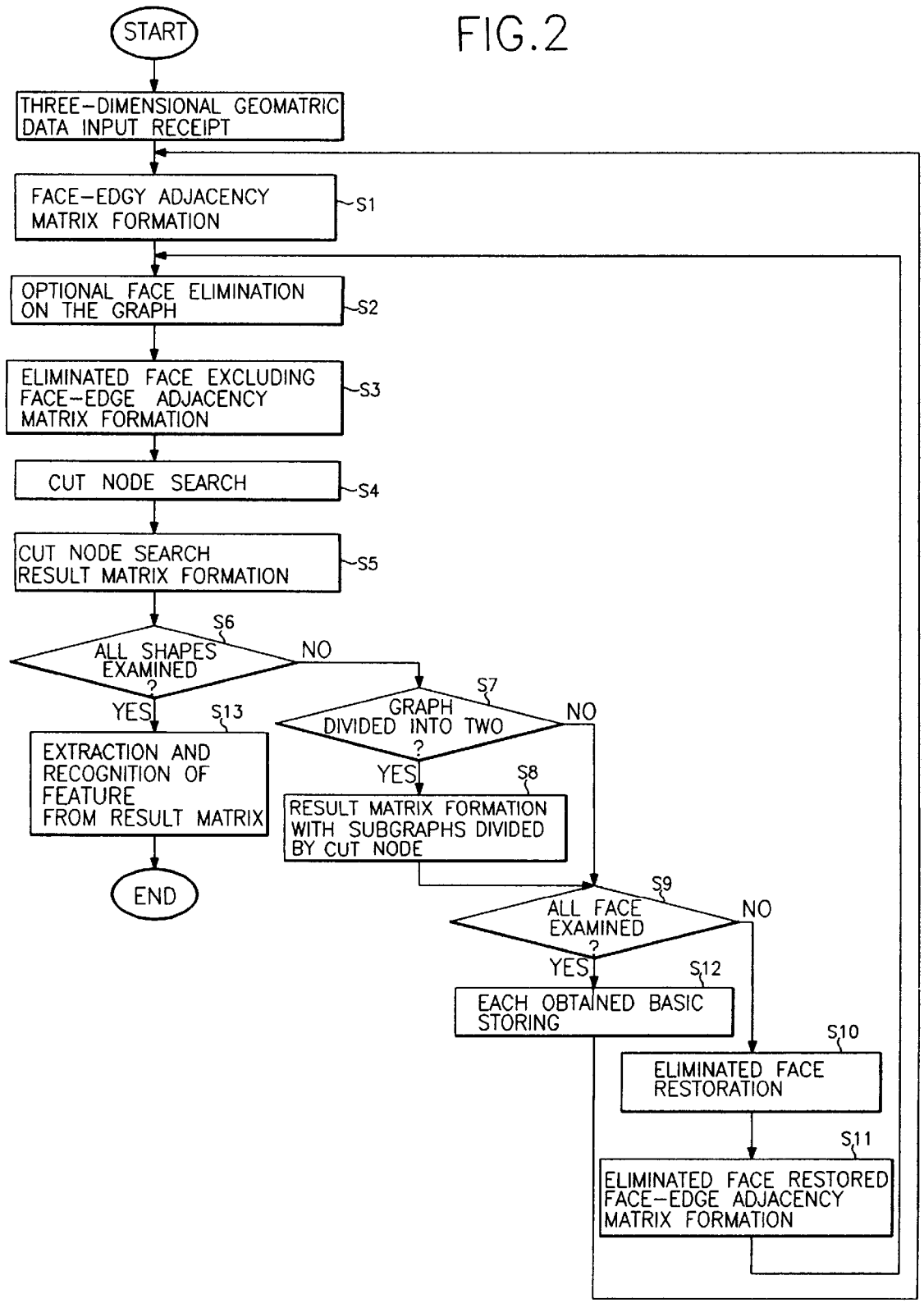
FIG. 2 is a flowchart of processing to extract features from three-dimensional geometric data under the present invention.

FIG. 2 is a flowchart of processing to extract features from three-dimensional geometric data under the present invention. FIG. 3 is an illustration for describing the conception of a face-edge adjacency graph and a cut node under the present invention.

The present invention will now be described by referring to FIG. 3.

In general, the geometric data obtained from the CAD system has data structure by a boundary representation method. As illustrated in FIG. 3, such a model can be represented by a face-edge adjacency graph which represents a face by a node and an edge by an arc between the faces.

For example, if geometric data with different-sized right hexahedrons heaped up is represented by the face-edge adjacency graph as illustrated in FIG. 3, the topmost face ⑥ is connect with ⑦⑧⑨⑩ faces via one projecting regular edge '1', the ⑦⑧⑨⑩ faces are connected with adjacent faces via the projecting regular edge '1', the ⑦⑧⑨⑩ faces are connected with one cut node ⑤ via a reversed edge '−1', the cut node ⑤ is connected with ①②③④ faces via the projecting regular edge '1', the ①②③④ faces are connected with adjacent faces via the projecting regular edge '1' and the ①②③④ faces are connected with one face via the projecting regular edge '1'.

As illustrated in FIG. 2, the present invention performs first a step of forming (S1) a face-edge adjacency graph into a matrix after receiving input of three-dimensional geometric data a from the CAD system. If forms the face-edge adjacency graph into the matrix as illustrated in FIG. 3.

Then, it performs a step of eliminating (S2) an optional face on the graph from the face-edge adjacency relation matrix, a step of forming (S3) again the face-edge adjacency relation matrix excluding the eliminated face and a cut node searching (S4) step of detecting the eliminated face as a cut node if the graph is divided into the two graphs.

If there are two disconnected subgraphs by eliminating the optional face from the matrix and after checking the connection of the remaining faces, this face is fixed upon as a cut node. FIG. 3 shows the conception of such a cut node. In FIG. 3, nodes excepting the node ⑤ are formed into one graph with connection between them maintained if removed on the graph. In the case of the node ⑤, however, nodes are severed and the two subgraphs are formed. At this time, the node ⑤ can be considered to be a cut node and the feature to be subgraphs connected by such a node.

Subsequently, it performs a step of forming (S5) the result of cut node search into a matrix, a step of judging (S6) if all shapes are examined and a step of judging (S7) if the graph is divided into the two graphs in the case where all shapes are not examined.

When the graph is divided into the two graphs, the present eliminated face is a cut node, and it performs a step of forming (S8) a result matrix with subgraphs divided by the cut node. In the case where the graph is not divided into the two graphs and the result matrix is formed by subgraphs, it performs a step of judging (S9) if all faces in the graph under review are examined. If all faces are examined in the corresponding graph, it performs a step of storing (S12) each obtained basic shape and returns to the step of forming (S1) said face-edge adjacency relation matrix.

When all faces are not examined, it performs a step of restoring (S10) the eliminated face, and repeats the step of searching (S4) for a cut node by performing the step of eliminating (S2) the optional face on the graph after the eliminated face performs a step of forming (S11) a restored face-edge adjacency relation matrix.

When examination of all shapes is finished as a result of performing the step of judging (S6) if all shapes are examined, it performs a step (S13) of extracting features from the result matrix and recognizing it.

Thus, the present invention enables a computer to work out a process planing automatically by providing feature information required for the process plan.

On the other hand, the method of extracting features by means of such a cut node is subject to restriction in the case where incidence faces for the feature are plural like a through hole. In order to bring a solution to it, the conception of said single cut node is expanded into the conception of multi-cut node. In other words, the feature finally separated from the above cut node conception is a feature having one incidence face and it can have several incidence faces again in the inside, so that multi-cut node algorithm is made to be performed for each extracted feature.

In order to detect such a multi-cut node, an optional face is selected first and detected by search of a cut node, and another optional face is eliminated together with the optional face selected first and connection of the remaining faces is searched. As a result, if there are two subgraphs disconnected by the elimination of the two faces, these two faces are fixed upon as cut nodes. After an attempt is made at forming the result matrix by adding in turn a face to be eliminated in such a way, the cut nodes are detected by retrieving if there are disconnected graphs. If the result matrix is divided into subgraphs, the above process is repeated even for the subgraphs. The multi-cut node is obtainable by enlarging an incidence face in this way and the above process is repeated until multi-cut node algorithm is completely performed for all obtained basic shapes.

Thus, features like a pocket, a clogged hole, a through hole, a clogged slot, a corner end, a slot and an end are automatically recognized and a process planing can be thereby executed.

The present invention unifies design and processing, makes it easy to work out a process planing automatically and shortens a period of product development by obtaining the data related to the process planing from three-dimensional geometric data in the process of designing and processing mechanical parts.

What is claimed is:

1. A method of extracting features required for a process planing from three-dimensional geometric data, comprising:

a step of forming a face-edge adjacency relation matrix in the three-dimensional geometric data inputted from a CAD system and thereby forming a connection relation graph, a step of forming the adjacency relation matrix again and searching for a cut node by eliminating an optional face on the graph created by forming the matrix, a step of forming a result matrix with the subgraphs divided by the cut node if the graph is divided into two as a result of searching for the cut node, a step of repeating in turn the above cut node search and result matrix formation steps for all faces by restoring the eliminated face and eliminating again the other optional face and of storing each basic shape for the subgraphs divided into minimum units as a result, and a step of performing the above steps for all shapes divided into the subgraphs and then extracting and recognizing the above stored result matrix as features.

2. The method of extracting features required for a process planing from three-dimensional geometric data as defined in claim 1, wherein said cut node searching step comprises:

a step (S2) of eliminating an optional face on the face-edge adjacency relation matrix graph, a step (S3) of forming again the face-edge adjacency relation matrix excluding the eliminated face, a cut node searching step (S4) which, if there are two disconnected subgraphs in the matrix formed again, determines this face as a cut node, and a step (S5) of forming the result of searching for the cut node into the matrix again.

3. The method of extracting features required for a process planing from three-dimensional geometric data as defined in claim 1 is a method of extracting features required for a process planing from three-dimensional geometric data, characterized by that it further comprises, in order to overcome the limitations of single cut node, multi-cut node search which, after an optional face is selected first and another optional face is eliminated together with the optional face selected first, searches connection of the remaining faces, and finds the two subgraphs disconnected by the elimination of these two faces and searches for the subgraphs disconnected by the elimination of plural faces increasing the faces eliminated by the above process.

* * * * *

Disclaimer 3,982,923.—*Eugene G. Teach*, El Cerrito, Calif. GEM-BIS AMIDE HERBICIDE ANTIDOTE COMPOSITIONS AND METHODS OF USE. Patent dated Sept. 28, 1976. Disclaimer filed Nov. 21, 1977, by the assignee, *Stauffer Chemical Company*.

Hereby enters this disclaimer to claims 1 through 15 of said patent.

[*Official Gazette April 4, 1978.*]